(12) United States Patent
Radermacher et al.

(10) Patent No.: US 12,145,178 B2
(45) Date of Patent: Nov. 19, 2024

(54) METHOD AND APPARATUS FOR OPERATING A METAL PRINTING DEVICE

(71) Applicant: Gebr. Becker GmbH, Wuppertal (DE)

(72) Inventors: Bernhard Radermacher, Korschenbroich (DE); Christian Radau, Schwelm (DE)

(73) Assignee: Gebr. Beckey GmbH, Wuppertal (DE)

( * ) Notice: Subject to any disclaimer, the term of this patent is extended or adjusted under 35 U.S.C. 154(b) by 689 days.

(21) Appl. No.: 17/292,805

(22) PCT Filed: Nov. 6, 2019

(86) PCT No.: PCT/EP2019/080393
§ 371 (c)(1),
(2) Date: May 11, 2021

(87) PCT Pub. No.: WO2020/099213
PCT Pub. Date: May 22, 2020

(65) Prior Publication Data
US 2021/0394241 A1   Dec. 23, 2021

(30) Foreign Application Priority Data
Nov. 15, 2018   (DE) ...................... 10 2018 128 757.7

(51) Int. Cl.
*B08B 15/00* (2006.01)
*B08B 5/04* (2006.01)
(Continued)

(52) U.S. Cl.
CPC .............. *B08B 15/002* (2013.01); *B08B 5/04* (2013.01); *B22F 10/322* (2021.01); *B22F 12/70* (2021.01);
(Continued)

(58) Field of Classification Search
CPC .................. B08B 5/04; B08B 15/002
(Continued)

(56) References Cited

U.S. PATENT DOCUMENTS 8,794,263 B2 *  8/2014  Scott ....................... B22F 12/70
                                                     264/497
9,067,360 B2   6/2015  Wehning et al.
(Continued)

FOREIGN PATENT DOCUMENTS

DE   10 2016 216 839 A1   3/2018
DE   10 2017 206 792 A1   10/2018
(Continued)

OTHER PUBLICATIONS

International Search Report of PCT/EP2019/080393, mailed Feb. 26, 2020.

*Primary Examiner* — Allen R. B. Schult
(74) *Attorney, Agent, or Firm* — Collard & Roe, P.C.

(57) ABSTRACT

A method for operating a metal printing device has an enclosure in which the metal printing is carried out, the enclosure having an inlet and an outlet, and a fan also being provided, with which the atmosphere in the enclosure can be regenerated, a device also being provided in order to be able to extract particles in particular after a printing process is complete. In a first method step, process gas is extracted from the enclosure and conducted through a regeneration device in order to clean the atmosphere in the enclosure. In a second method step after the printing process is complete, excess particles are removed from the enclosure. A suction fan having a suction line connection is provided, wherein the mode can be switched over using a switchover device connected upstream of the suction fan.

4 Claims, 6 Drawing Sheets

(51) Int. Cl.
    *B22F 10/322* (2021.01)
    *B22F 12/70* (2021.01)
    *B22F 10/28* (2021.01)
    *B22F 10/73* (2021.01)
    *B22F 12/80* (2021.01)
    *B33Y 40/00* (2020.01)

(52) U.S. Cl.
    CPC ............... *B22F 10/28* (2021.01); *B22F 10/73* (2021.01); *B22F 12/80* (2021.01); *B33Y 40/00* (2014.12)

(58) Field of Classification Search
    USPC .......................................................... 454/49
    See application file for complete search history.

(56) References Cited

U.S. PATENT DOCUMENTS

| | | |
|---|---|---|
| 2016/0207147 A1 | 7/2016 | Van Hassel |
| 2018/0236603 A1 | 8/2018 | Carter et al. |
| 2019/0193148 A1 | 6/2019 | Kiener |
| 2019/0270138 A1 | 9/2019 | Ullmann et al. |

FOREIGN PATENT DOCUMENTS

| | | |
|---|---|---|
| EP | 2 289 652 A1 | 3/2011 |
| WO | 2017/197023 A1 | 11/2017 |
| WO | 2018/087251 A1 | 5/2018 |

\* cited by examiner

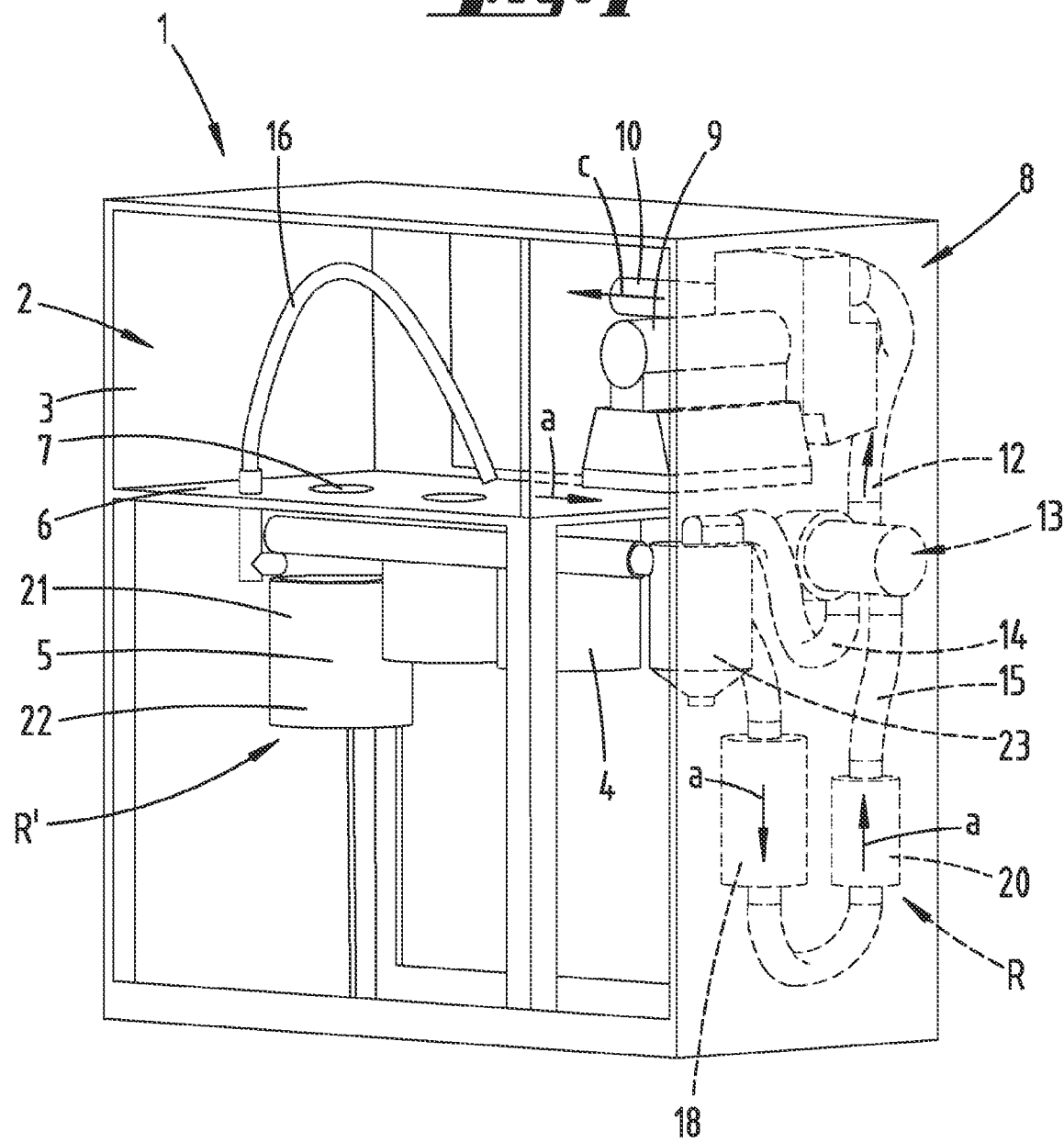

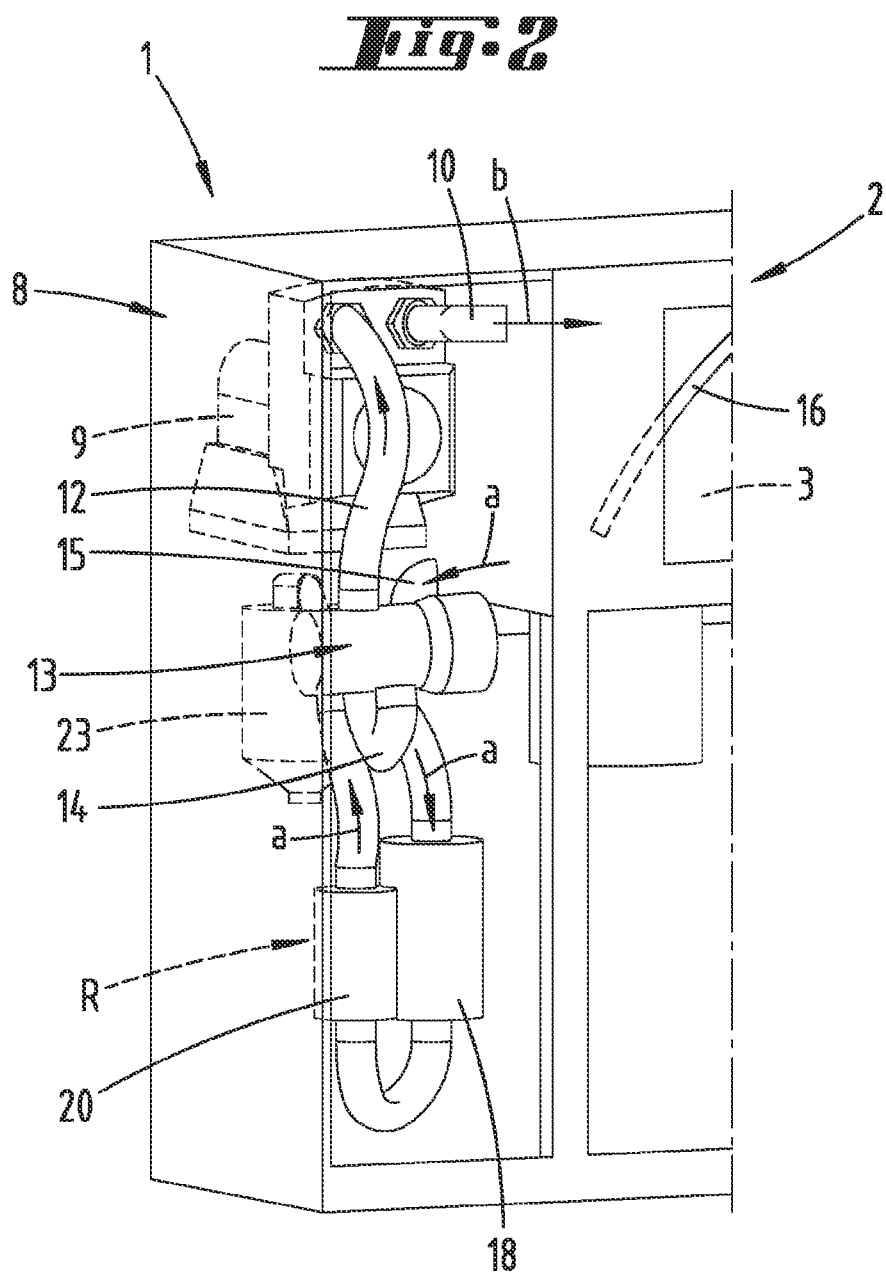

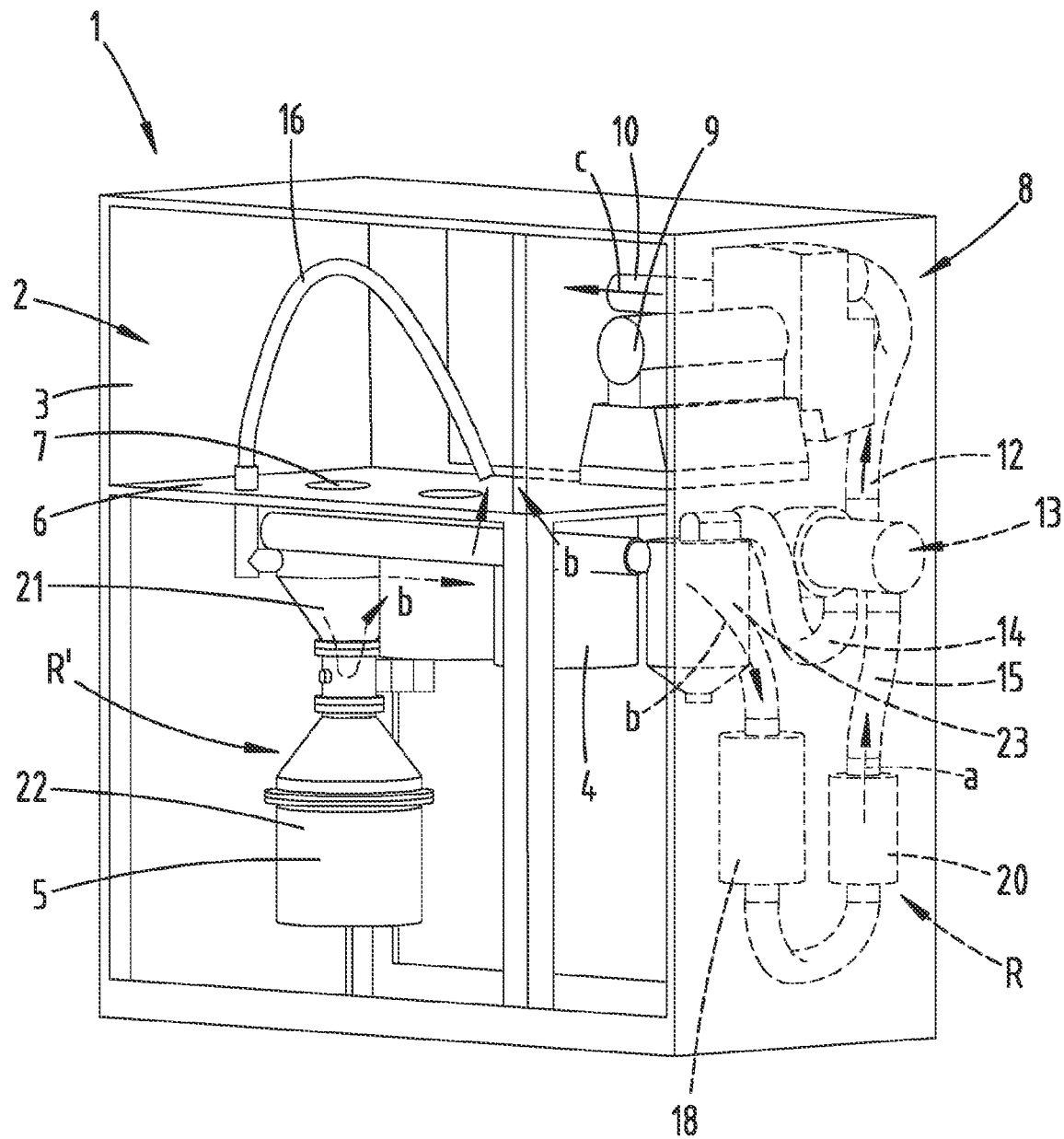

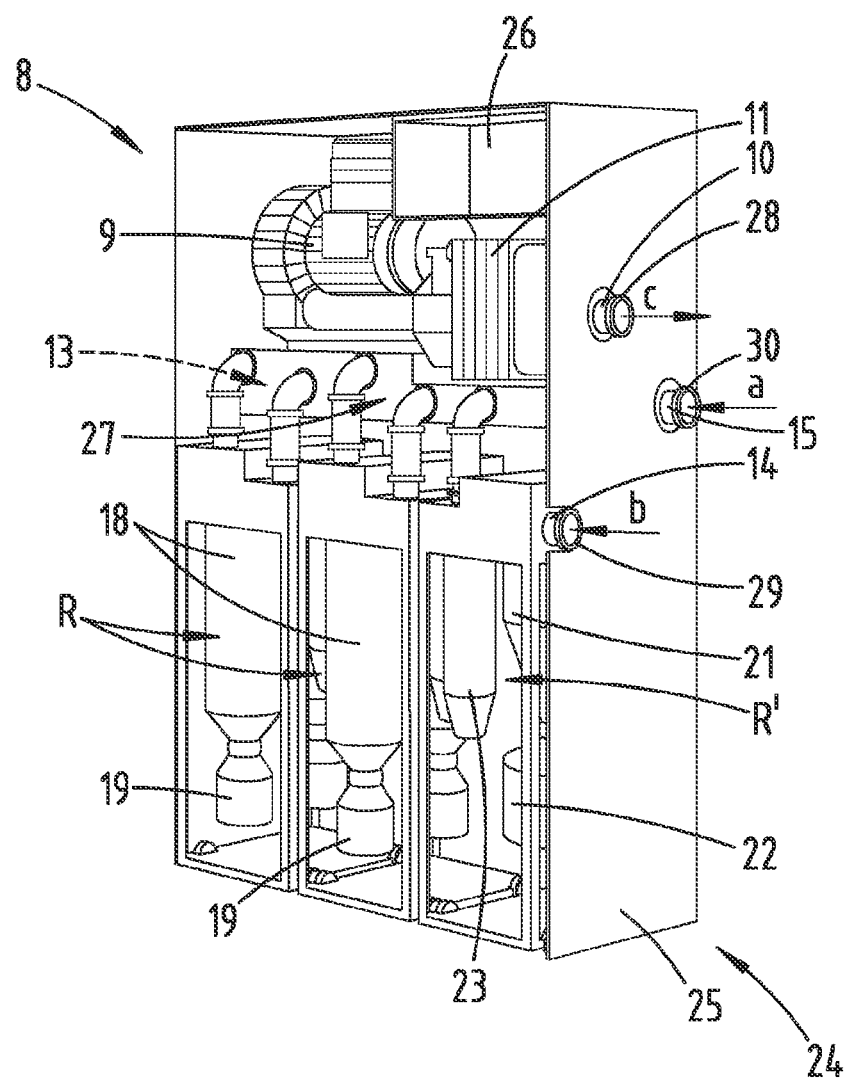

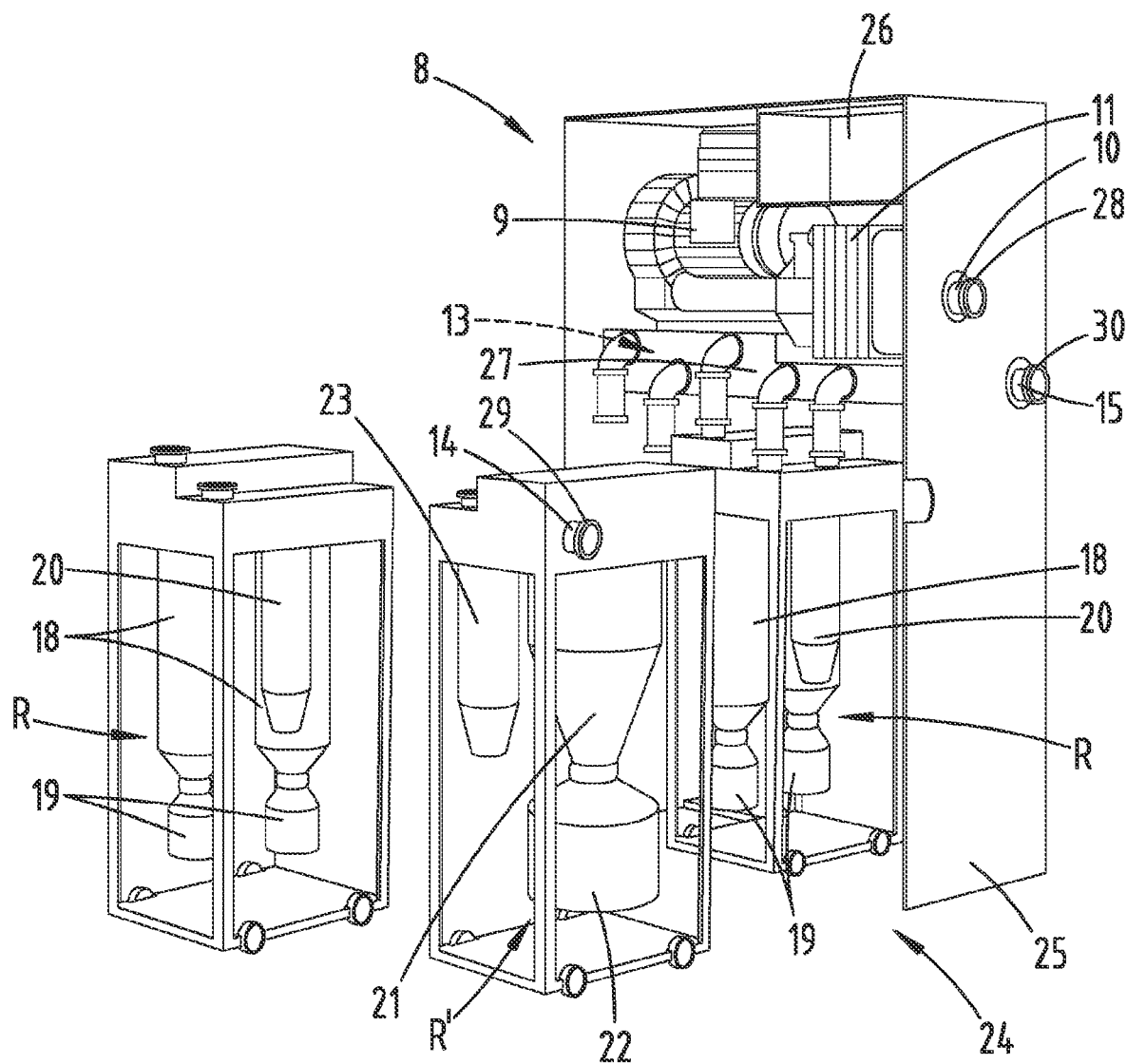

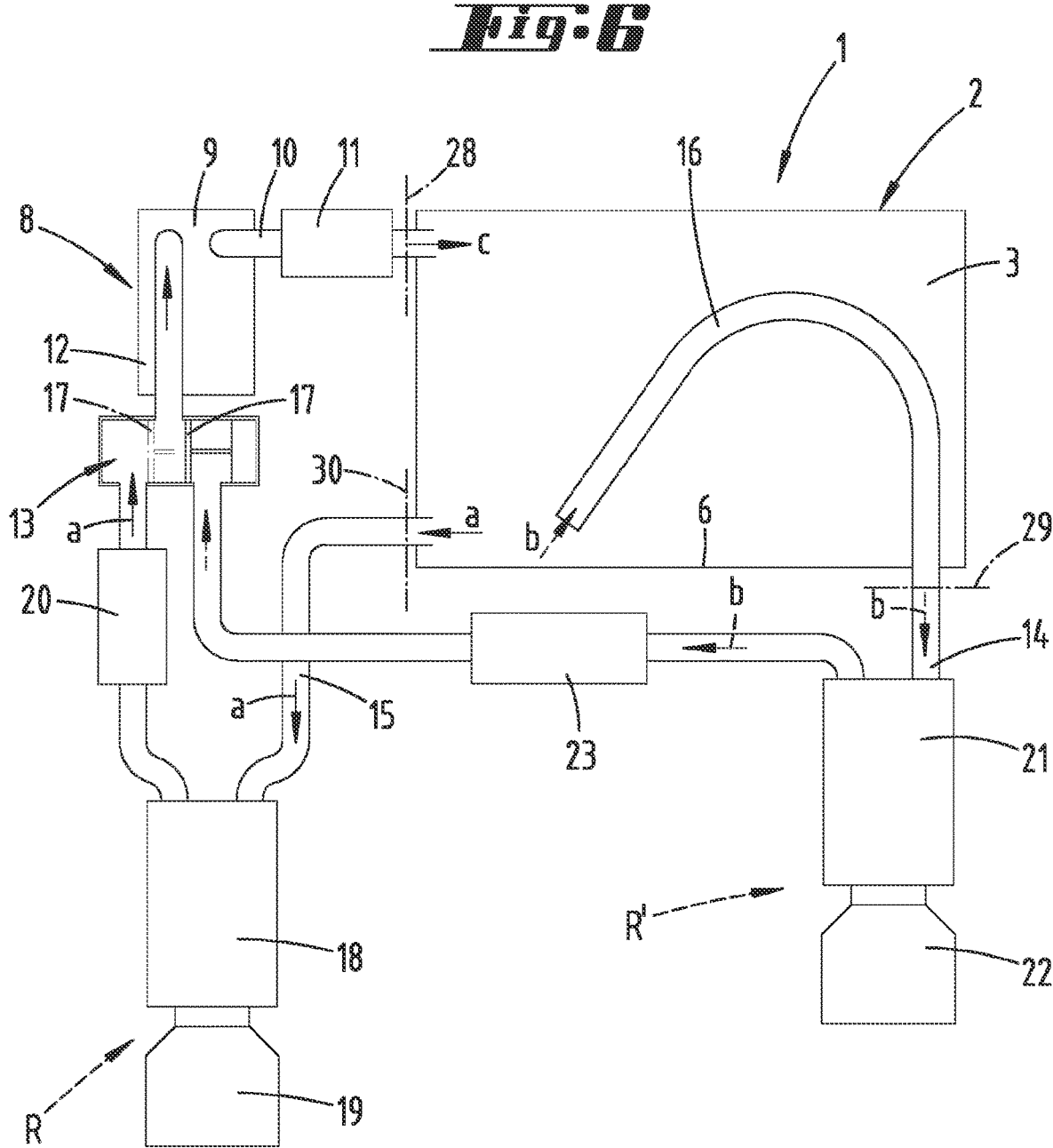

METHOD AND APPARATUS FOR OPERATING A METAL PRINTING DEVICE

CROSS REFERENCE TO RELATED APPLICATIONS

This application is the National Stage of PCT/EP2019/080393 filed on Nov. 6, 2019, which claims priority under 35 U.S.C. § 119 of German Application No. 10 2018 128 757.7 filed on Nov. 15, 2018, the disclosure of which is incorporated by reference. The international application under PCT article 21(2) was not published in English.

TECHNICAL FIELD

The invention initially pertains to a method for operating a metal printing device with an enclosure, in which the metal printing process is carried out, wherein the enclosure has an inlet and an outlet, wherein a fan is also provided, by means of which an atmosphere in the enclosure can be regenerated, wherein a device is also provided in order to be able to extract particles, particularly after the completion of a printing process, wherein process gas is extracted from the enclosure by using the outlet and conveyed through a regeneration device in a first process step in order to clean the atmosphere in the enclosure, and wherein excess particles are removed from the enclosure by means of the device in a second process step after the completion of the printing process.

The invention furthermore pertains to an apparatus for operating a metal printing device with an enclosure, in which the metal printing process is carried out, wherein the enclosure has an inlet and an outlet, wherein a fan is also provided, by means of which an atmosphere in the enclosure can be regenerated, wherein a device is also provided in order to be able to extract particles, particularly after the completion of a printing process, wherein process gas can be extracted from the enclosure by using the outlet and conveyed through a regeneration device in order to clean the atmosphere in the enclosure, and wherein excess particles can be removed from the enclosure by means of the device after the completion of the printing process.

PRIOR ART

In metal printing devices, it is known to supply the enclosure of the printing device with process gas in a circulation process, wherein said process gas is respectively cleaned or regenerated with respect to contaminants that are formed during the metal printing process, particularly when using lasers. In this context, it is furthermore known to once again remove metal particles, which respectively remained in the device or the enclosure, in which the printing process was carried out, and did not fuse to the objects produced in this process, by means of suction after the completion of a metal printing process. To this end, known devices comprise a fan for cleaning the atmosphere in the enclosure, which is typically formed by the process gas, as well as a suction fan for the particle removal.

A metal printing device is known, for example, from DE 10 2017 206 792 A1.

US 2016/207147 A1 discloses an apparatus for operating a metal printing device, in which process gas extracted from the enclosure by means of a suction channel is cleaned by means of a fan. DE 10 2016 216 839 A1 discloses a method for removing filling material from a cavity present in a component by means of a robot.

SUMMARY OF THE INVENTION

The invention aims to disclose an advantageous method and an advantageous apparatus for operating a metal printing device based on the prior art according to US 2016/207147 A1.

With respect to the method, this objective is attained with a method, in which it is proposed that a fan in the form of a suction fan with a suction line connection is provided, that a first and a second suction channel are provided starting from the enclosure and converge in a switchover device connected upstream of the suction fan, and that the first process step, as well as the second process step, is carried out with the suction fan, wherein the mode is switched over between a suction side connection of the first and/or the second suction channel to the suction fan by means of the switchover device connected upstream of the suction fan.

With respect to the apparatus, this objective is attained in that a fan in the form of a suction fan with a suction line connection is provided, that an extraction of process gas from the enclosure for regenerating the atmosphere, as well as an extraction of excess particles from the enclosure after the completion of the printing process, can be carried out with the suction fan, and that a first and a second suction channel are provided starting from the enclosure and converge in a switchover device connected upstream of the suction fan such that the mode can be switched over between a suction side connection of the first and/or the second suction channel (14, 15) to the suction fan.

The described extraction of process gas from the enclosure, as well as the removal of excess particles, may be carried out by using different outlets. The inlet preferably is used for once again supplying the enclosure with cleaned or clean process gas.

The process gas typically is an inert gas such as argon or nitrogen, wherein it is preferred that argon or nitrogen is the sole gas used as process gas. However, the process gas may basically also be a mixture of gases, particularly also inert gases. The typical objective in this respect can be seen in that the atmosphere in such an enclosure contains no oxygen or practically no oxygen.

The proposed solution proves particularly advantageous with respect to its manufacture and application. Only one suction fan is provided for carrying out the first process step and the second process step, wherein said suction fan is, if applicable, selectively used for carrying out the first or second process step. Such a method and such an apparatus also prove advantageous with respect to the maintenance of the apparatus because it is now merely required to provide one suction fan for carrying out both process steps.

The suction fan may also be used for potentially carrying out both process steps simultaneously. For example, the first process step for cleaning the atmosphere in the enclosure particularly may also be carried out at the same time as the second process step for removing excess metal particles from the enclosure.

A separate suction channel extending from the enclosure in the direction of the suction fan is respectively provided for each mode or each process step, wherein both suction channels converge in a switchover device. One or the other suction channel or, if applicable, both suction channels can then be connected to the suction side of the suction fan by using this switchover device in order to correspondingly carry out the first or the second process step.

In this case, the switchover device may be designed in such a way that either a first mode (first process step) or a second mode (second process step) can be carried out. However, the switchover device may in another embodiment also have a switching position, in which both modes, i.e. the first and the second process step, can be carried out simultaneously.

In a potential embodiment, a process gas suction flow may in the first process step be conveyed through a first regeneration device that differs from a second regeneration device, through which the process gas suction flow is conveyed in the second process step. Accordingly, at least two regeneration devices may be provided in the apparatus or associated with the apparatus, namely one regeneration device for carrying out the first process step (regeneration of the atmosphere in the enclosure) and one regeneration device for carrying out the second process step (removal of excess particles after the completion of the printing process).

The regeneration devices for the first and the second process step may be realized identically with respect to their design and the optionally provided filters or filter devices. However, these regeneration devices may also be realized differently with respect to their basic design or also with respect to only one component, e.g. the filter. Furthermore, the respective regeneration device may be adapted to the respective process step, particularly with respect to the filter properties, namely to a separation of gaseous components and/or small and very small particles from the process gas extracted from the enclosure on the one hand and to the separation of particles, particularly metal particles, that may be larger than the small and very small particles to be filtered out of the process gas suction flow.

The particles separated in the corresponding regeneration device, particularly the larger particles separated in the course of the second process step, may be collected in the regeneration device or downstream thereof in a separation container. If applicable, these larger separated particles may be once again supplied to the next printing process.

Such a separation in a collection container or the like may also be carried out with respect to the fine and very fine particles separated from the enclosure atmosphere in the first process step.

According to a preferred embodiment, the process gas suction flow for the first and/or second process step can be conveyed out of the enclosure. Furthermore, the one regeneration device or the multiple regeneration devices and preferably also the suction fan particularly may be arranged outside the enclosure, but optionally associated with this enclosure. A filtration of the process gas suction flow, if applicable a first filtration, preferably can take place outside the enclosure.

Process gas can also be conveyed into the enclosure in a clean or cleaned state by means of the same suction fan. The suction fan may furthermore have a suction opening and a pressure opening. Process gas can be conveyed into the enclosure in a clean or cleaned state via the pressure opening. A preliminary filter and/or a cooling device for correspondingly treating the process gas in a clean or cleaned state may be connected between the suction fan and the enclosure.

The suction fan, as well as the first and the second regeneration device, may be arranged in a common housing together with the enclosure such that they are directly associated with the enclosure.

In another embodiment, the suction fan may be combined with the first and the second regeneration device in a module that is formed by a common housing, wherein the module is connected to the enclosure by means of at least one suction line and one pressure line. Such a module can be associated with the enclosure in order to carry out the above-described process steps, wherein a corresponding interface may be provided in the region of the at least one suction line and one pressure line.

The module may also be connected to the enclosure by means of two suction lines and one pressure line. The process gas can be conveyed into the enclosure in the clean or cleaned state via the pressure line. The two suction lines serve for carrying out the first and the second process step.

The switchover device may also be associated with the enclosure in an above-described modular construction. In this respect, the switchover device preferably is arranged in the module such that the switchover between the two suction lines can be carried out in this module.

In a given modular construction, it is furthermore preferred to also provide an electric interface and/or a communication interface between the enclosure or the control of the metal printing device and the module, particularly for activating and deactivating the suction fan, as well as for switching over the switchover device between the first and the second process step.

According to another embodiment, two regeneration devices for the first process step may be associated with the module, wherein a flow only takes place through one of these regeneration devices during the operation of the apparatus. This allows an uninterrupted operation of the metal printing device in the printing mode and therefore in the first process step. For example, one regeneration device for the first process step therefore can also be removed from the module during the ongoing operation in the course of the first process step, e.g. in order to be cleaned and/or emptied, while the second regeneration device is active for the filtration and separation in the course of cleaning the atmosphere.

According to a preferred embodiment, only one regeneration device may be provided for the second process step. The maximum separation capacity of this regeneration device may be adapted to the overall maximum volume of particles, particularly metal particles, processed in the metal printing device or in the enclosure, respectively.

BRIEF DESCRIPTION OF THE DRAWINGS

The invention is described in greater detail below with reference to the attached drawings that, however, merely show exemplary embodiments. A component, which is described with reference to one of the exemplary embodiments and not replaced with a different component in another exemplary embodiment, is therefore also described as a potentially existing component in this other exemplary embodiment. In the respective drawings:

FIG. 1 shows a schematic perspective illustration of an apparatus for operating a metal printing device with an enclosure and a suction fan for carrying out a first and a second process step, wherein this figure concerns the implementation of the first process step;

FIG. 2 shows a schematic rear view of the apparatus concerning the implementation of the first process step;

FIG. 3 shows an illustration that essentially corresponds to FIG. 1 and concerns the second process step, wherein the collection container illustrated in this figure is larger than in FIG. 1;

FIG. 4 shows another embodiment, in which the suction fan, the regeneration devices and a switchover device are combined in a module;

FIG. 5 shows a perspective illustration that essentially corresponds to FIG. 4 after the removal of two regeneration devices; and FIG. 6 shows a schematic illustration of the apparatus.

DESCRIPTION OF THE EMBODIMENTS

An apparatus 1 for operating a metal printing device 2 is initially described with reference to FIG. 1.

The metal printing device 2 initially and essentially comprises an enclosure 3, in which the metal printing process can be carried out. In this case, a desired component is produced layer-by-layer of fine metal powder as a result of selective laser melting under the influence of a laser beam. The production may be based directly on so-called 3D-CAD data such that fully functional components can be produced of high-quality metals.

In addition to the not-shown laser device, the printing device essentially also comprises an application device for applying a metal powder layer, as well as a particle supply container 4 and a particle collection container 5, into which excess particles can be stripped.

To this end, a corresponding opening 7 is provided in the processing surface 6.

The production of the metal component preferably can take place in an enclosure 3 that is closed on all sides and may, if applicable, be provided with a door or the like that seals the enclosure 3.

With respect to the production process, we refer, for example, to initially cited publication DE 10 2017 206 792 A1.

The atmosphere in the enclosure 3 preferably is regenerated during the printing process. To this end, a process gas, which preferably is a protective gas such as argon or nitrogen, is blown into the enclosure 3 and simultaneously extracted in a circulation process. A suction device 8 with a suction fan 9 is used for this purpose. The suction fan 9 may be a so-called side channel blower or the like.

In the first exemplary embodiment illustrated in FIGS. 1-3, the suction device 8 is arranged in the apparatus 1 and directly associated with the metal printing device 2.

The schematic illustration in FIG. 6 furthermore shows that the suction fan 9 is fluidically connected to the interior of the enclosure by means of a pressure line 10 and a suction line connection 12.

In this case, the pressure line 10 originating from the suction fan 9 may directly lead into the enclosure 3, if applicable with interposition of a cooler 11, and be associated with a ceiling region. During the operation, the pressure flow of the process gas in the pressure line 10 therefore extends in a direction c.

The suction line connection 12, which is also connected to the suction fan 9, leads to a switchover device 13 that is designed for selectively producing a fluidic connection between this suction line connection 12 and a first suction line 14 or a (second) suction line 15.

In the exemplary embodiments shown, the suction line 15 leads into the enclosure 3 and is associated with the processing surface 6 whereas the other (first) suction line 14 is fluidically connected to a flexible hose element 16, which extends within the enclosure 3 and serves for a manual extraction within the enclosure 3.

The switchover device 13 may likewise form part of the suction device 8 as shown and accordingly be arranged such that it is locally associated with the suction fan 9.

In addition, the switchover device 13 may be operable manually or alternatively in a motor-driven fashion, e.g. by means of an electric motor, wherein a gate element 17, which is only illustrated schematically in FIG. 6, preferably releases only one flow path, namely the flow path leading from the suction line 14 into the suction line connection 12 or the flow path leading from the suction line 15 into the suction line connection 12 (see dotdashed illustration in FIG. 6).

When the suction flow through the suction line 14 is correspondingly activated, the hose element 16 is used for extracting possible metal particles that may still be located, e.g., on the processing surface 9 after the printing process and/or for emptying, e.g., the particle collection container 5.

Consequently, the same suction fan 9 can be used for both process steps, namely the first process step concerning the process gas or protective gas circulation and the second process step concerning the extraction of excess metal particles via the hose element. In this case, the suction flow for the first process step and for the second process step is always conveyed out of the enclosure 3 and the clean gas is directly conveyed into the enclosure, if applicable with interposition of a cooler 11.

During the process gas circulation (first process step), the suction line 15 is connected to the suction line connection of the active suction fan 9 by means of the switchover device 13, wherein a preliminary filter 18 with an optionally removable collection container 19 is in the exemplary embodiments shown initially interposed in the suction line 15 upstream of the switchover device 13 referred to the flow direction a and a fine filter 20 is interposed downstream of the preliminary filter 18 referred to the flow direction a. The preliminary filter 18, the collection container 19 and the fine filter 20 may collectively form a regeneration device R.

During the implementation of the second process step for extracting possible metal particles by means of the hose element 16, process gas that, if applicable, contains entrained metal particles is conveyed to the suction line connection 12 via the suction line 14 and the switchover device 13, wherein a regeneration device R' is in this case also interposed in the suction line 14 in the region located upstream of the switchover device 13 referred to the flow direction, and wherein said regeneration device comprises referred to the flow direction b initially a particle separator 21 with a preferably removable particle collection container 22 and a fan protection filter 23 arranged downstream thereof referred to the flow direction b.

FIGS. 1 and 3 show particle collection containers 22 with different collection volumes.

As an alternative to a direct association of the suction device 8 with the enclosure 3 according to the illustrations in FIGS. 1 to 3, the suction device 8 may also be realized in the form of a module 24. Such a module 24 can be associated with a metal printing device 2, namely via corresponding flow interfaces, as well as preferably electric or electronic interfaces.

To this end, the suction fan 9, the filters and separators combined into regeneration devices R and R', as well as the switchover device 13, may be combined in a common housing 25.

In addition to the suction fan 9, a switchgear cabinet 26, the cooler 11 and a distribution and control block 27 may furthermore be arranged in the module 24. It is preferred that the switchover device 13 is respectively integrated into or formed by the distribution and control block 27.

The filter and separator units of the regeneration device R for carrying out the first process step (circulation) may be realized in the form of a module that can be extended out of the housing 25, wherein said module comprises a preliminary filter 18—or two preliminary filters as shown—as well as a collection container 19 associated with each preliminary filter 18 and a fine filter 20 arranged downstream thereof referred to the flow direction.

The illustrations show that two such regeneration devices R for carrying out the first process step are provided in the exemplary embodiment shown in order to thereby be achieved a long service life of the filter system. Due to the arrangement of two such regeneration devices R, a filter change can be realized without interruption in the production process by switching over from one regeneration device R to the other regeneration device R.

The modular regeneration device R' for carrying out the second process step (particle extraction) may also be realized such that it can be extended out of the housing 25 as shown. In this case, the regeneration device R' preferably comprises the particle separator 21 and the particle collection container 22, as well as the fan protection filter 23.

The suction lines 14 and 15 and also the pressure line 10 may extend outward through the housing 25 in order to respectively form an interface 28, 29 and 30, wherein the corresponding flow line connection to the enclosure 3 or the hose element 16 can be respectively produced by means of said interfaces.

The proposed invention provides a high level of the gas tightness in the region of all components, particularly during the production process. The suction fan 9 or circulation fan respectively ensures an optimal protective gas flow in the first process step and an optimal process gas and powder conveyance in the second process step, namely over broad pressure and volumetric flow ranges and with little heat development.

LIST OF REFERENCE SYMBOLS

1 Apparatus
2 Metal printing device
3 Enclosure
4 Particle supply container
5 Particle collection container
6 Processing surface
7 Opening
8 Suction device
9 Fan
10 Pressure line
11 Cooler
12 Suction line connection
13 Switchover device
14 Suction line
15 Suction line
16 Hose element
17 Gate element
18 Preliminary filter
19 Collection container
20 Fine filter
21 Particle separator
22 Particle collection container
23 Fan protection filter
24 Module
25 Housing
26 Switchgear cabinet
27 Distribution and control block
28 Interface
29 Interface
30 Interface
a Process gas suction flow
b Process gas suction flow
c Process gas pressure flow
R Regeneration device
R' Regeneration device

The invention claimed is:

1. A method for operating a metal printing device with an enclosure, in which a metal printing process is carried out, wherein the enclosure has an inlet and an outlet, and a fan is provided, by means of which an atmosphere in the enclosure can be regenerated, wherein a device for extracting particles is provided, comprising:
in a first process step, extracting process gas from the enclosure by using the outlet and conveying the process gas through a regeneration device in order to clean the atmosphere in the enclosure, and
in a second process step, removing excess particles from the enclosure by means of the device for extracting particles after completion of the printing process,
wherein a fan in the form of a suction fan with a suction line connection is provided, wherein a first and a second suction channel are provided starting from the enclosure and converging in a switchover device connected upstream of the suction fan and wherein the first process step as well as the second process step are carried out with the suction fan, and wherein the switchover device switches a mode between a suction side connection of the first suction channel to the suction fan for carrying out the first process step and/or a suction side connection of the second suction channel to the suction fan for carrying out the second process step,
wherein the first suction channel leads into the enclosure and is associated with a processing surface, and wherein the second suction channel is fluidly connected to a flexible hose element which extends within the enclosure.

2. The method according to claim 1, wherein the regeneration device through which the process gas suction flow is conveyed in the first process step is a first regeneration device that differs from a second regeneration device, through which the process gas suction flow is conveyed in the second process step.

3. The method according to claim 2, wherein the first and/or the second regeneration device comprises a filter element.

4. The method according to claim 1, wherein process gas is also conveyed into the enclosure in a clean or cleaned state by means of the same suction fan.

* * * * *